US012641028B2

(12) United States Patent
Prabhu

(10) Patent No.: US 12,641,028 B2
(45) Date of Patent: May 26, 2026

(54) CACHE-ASSISTED SERVICE CONTACT INSTANCE SELECTION FOR COMPUTING-AWARE TRAFFIC STEERING NETWORKS

(71) Applicant: Nokia Solutions and Networks Oy, Espoo (FI)

(72) Inventor: Shailesh Prabhu, Manipal (IN)

(73) Assignee: Nokia Solutions and Networks Oy, Espoo (FI)

( * ) Notice: Subject to any disclaimer, the term of this patent is extended or adjusted under 35 U.S.C. 154(b) by 241 days.

(21) Appl. No.: 18/440,070

(22) Filed: Feb. 13, 2024

(65) Prior Publication Data

US 2025/0260647 A1     Aug. 14, 2025

(51) Int. Cl.
H04L 47/125          (2022.01)
H04L 47/10           (2022.01)

(52) U.S. Cl.
CPC ............ H04L 47/125 (2013.01); H04L 47/29 (2013.01)

(58) Field of Classification Search
CPC ... H04L 47/125; H04L 47/29; H04L 41/5045; H04L 43/50; H04L 41/5051; H04L 67/568
See application file for complete search history.

(56) References Cited

U.S. PATENT DOCUMENTS 6,795,858 B1     9/2004   Jain
7,284,051 B1     10/2007  Okano

| | | |
|---|---|---|
| 7,555,542 B1 | 6/2009 | Ayers |
| 8,909,786 B2 | 12/2014 | Lee et al. |
| 11,063,881 B1 | 7/2021 | Vijayasuganthan |
| 2004/0221061 A1 | 11/2004 | Chavez |
| 2009/0292824 A1 | 11/2009 | Marashi |
| 2014/0016467 A1 | 1/2014 | Bernstein et al. |
| 2014/0040478 A1 | 2/2014 | Hsu |
| 2016/0352631 A1 | 12/2016 | Medved et al. |
| 2017/0187609 A1 * | 6/2017 | Lee .................... H04L 12/6418 |
| 2018/0234488 A1 | 8/2018 | Lee |

(Continued)

FOREIGN PATENT DOCUMENTS

| | | | |
|---|---|---|---|
| EP | 2913979 B1 | 7/2019 | |
| WO | WO-2025168644 A1 * | 8/2025 | ........... H04L 67/101 |

OTHER PUBLICATIONS

Non-Final Office Action in U.S. Appl. No. 18/594,471; dated Jun. 17, 2025 (21 Pages).

(Continued)

*Primary Examiner* — Javier O Guzman
(74) *Attorney, Agent, or Firm* — Mendelsohn Dunleavy, P.C.; Steve Mendelsohn

(57)          ABSTRACT

In a computing-aware traffic steering (CATS) network, such as those conforming to an IETF proposal, a service contact instance for a requested service is selected based on at least cache metrics associated with data cached at one or more egress nodes of the CATS network. In some embodiments, the selection is also based on compute and network metrics. In one implementation, the selection is based only on cache metrics unless that selection is too costly in terms of compute and/or network load. In that case, the selection is based on the compute and network metrics. In this way, cache metrics are prioritized over compute and network metrics as long as the cache-based selection is not too costly.

17 Claims, 3 Drawing Sheets

100

(56) References Cited

U.S. PATENT DOCUMENTS

| | | | |
|---|---|---|---|
| 2018/0278570 A1 | 9/2018 | Dhanabalan | |
| 2025/0126490 A1* | 4/2025 | Kim | H04W 24/02 |
| 2025/0133421 A1* | 4/2025 | Kim | H04W 76/10 |

OTHER PUBLICATIONS

Extended European Search Report in Corresponding European Application No. 25157492.7-1218; dated Jun. 11, 2025 (10 Pages).

"Computing Aware Traffic Steering Use Cases of Mobile User Plane using Segment Routing," 2023 [retrieved on Oct. 21, 2023] Retrieved from the Internet: draft-duongph-dmm-computing-aware-ts-mupsr-01; draft-duongph-dmm-computing-aware-ts-mup-sr-01.txt (15 Pages).

Randriamasy, Sabine, et al. "Network- and Compute-Aware Service Contact Point Selection." U.S. Appl. No. 18/594,471, filed Mar. 4, 2024 (31 pages).

Transitioning to latency-based routing in Amazon Route 53, www.amazon.com, 2016 [retrieved on May 14, 2024] Retrieved from the Internet: <URL: https://docs.aws.amazon.com/Route53/latest/DeveloperGuide/TutorialTransitionToLBR.html> (3 pages).

BGP-LS, www.nokia.com, 2022 [retrieved on May 14, 2024] Retrieved from the Internet: <URL: https://infocenter.nokia.com/public/7750SR225R1A/index.jsp?topic=/com.nokia.Unicast_Guide/bgp-ls-ai9exj5ykf.html> (1 page).

"IETF 118 Side Meeting: Exposure of Communication and Compute information to Support Edge Computing Applications." Side Meeting Minutes, IETF 118. Prague, Czechia. <https://docs.google.com/document/d/1wCuU6uam_Yso8jPslgrvxWuXI_DwpbnDBip5JFpzGdo/edit?usp=sharing> (Nov. 8, 2023): 1-3.

[draft-yao-cats-awareness-architecture-02] Yao, H., et al. "Computing and Network Information Awareness (CNIA) system architecture for CATS." Internet-Draft, <https://datatracker.ietf.org/doc/draft-yao-cats-awareness-architecture/> (Oct. 23, 2023): 1-17.

[draft-contreras-alto-service-edge-10] Contreras, L. M., et al. "Use of ALTO for Determining Service Edge." Internet-Draft, <https://datatracker.ietf.org/doc/draft-contreras-alto-service-edge/> (Oct. 13, 2023): 1-41.

[draft-du-cats-computing-modeling-description-02] DU, Zongpeng, et al. "Computing Information Description in Computing-Aware Traffic Steering." Internet-Draft, <https://datatracker.ietf.org/doc/draft-du-cats-computing-modeling-description/> (Oct. 23, 2023): 1-13.

[draft-dunbar-cats-edge-service-metrics-01] Dunbar, L., e tal. "5G Edge Services Use Cases." Internet-Draft <https://datatracker.ietf.org/doc/draft-dunbar-cats-edge-service-metrics/> (Jul. 6, 2023): 1-19.

[draft-ietf-teas-rfc3272bis-27] Farrel, A., Ed., and Old Dog Consulting "Overview and Principles of Internet Traffic Engineering." Internet-Draft, <https://datatracker.ietf.org/doc/html/draft-ietf-teas-rfc3272bis-27> (Aug. 12, 2023): 1-91.

[draft-ldbc-cats-framework-04] Li, Cheng, Ed., Du, Z., et al., "A Framework for Computing-Aware Traffic Steering (CATS)", Work in Progress, Internet-Draft <https://datatracker.ietf.org/doc/html/draft-ldbc-cats-framework-04>. (Dec. 8, 2023): 1-19.

[draft-rcr-opsawg-operational-compute-metrics-00] Randriamasy, S., et al. "Joint Exposure of Network and Compute Information for Infrastructure-Aware Service Deployment." Internet-Draft <https://datatracker.ietf.org/doc/draft-rcr-opsawg-operational-compute-metrics/00/> (Oct. 23, 2023): 1-8.

[RFC7285] Alimi, R., Ed., et al. "Application-Layer Traffic Optimization (ALTO) Protocol." RFC 7285, DOI 10.17487/RFC7285, <https://www.rfc-editor.org/info/rfc7285> (Sep. 2014): 1-91.

[RFC7665] Halpern, J., Ed. and Pignataro, C. , Ed., "Service Function Chaining (SFC) Architecture", RFC 7665, DOI 10.17487/RFC7665, <https://www.rfc-editor.org/rfc/rfc7665> (Oct. 2015): 1-32.

[RFC7971] Stiemerling, M., et al. "Application-Layer Traffic Optimization (ALTO) Deployment Considerations." RFC 7971, DOI 10.17487/RFC7971, <https://www.rfc-editor.org/info/rfc7971> (Oct. 2016): 1-77.

[RFC 8189] Randriamasy, S., et al. "Multi-Cost Application-Layer Traffic Optimization (ALTO)." RFC 8189, DOI 10.17487/RFC8189 <https://datatracker.ietf.org/doc/rfc8189/> (Oct. 2017): 1-29.

[RFC 8895] Roome, W., et al. "Application-Layer Traffic Optimization (ALTO) Incremental Updates Using Server-Sent Events (SSE)." RFC 8895, DOI 10.17487/RFC8895 <https://datatracker.ietf.org/doc/html/rfc8895> (Nov. 2020): 1-52.

[RFC 8896] Randriamasy, S., et al. "Application-Layer Traffic Optimization (ALTO) Cost Calendar." RFC 8896, DOI 10.17487/RFC8896 <https://datatracker.ietf.org/doc/rfc8896/> (Nov. 2020): 1-35.

[RFC9420] Roome, W., et al. "An Extension for Application-Layer Traffic Optimization (ALTO): Entity Property Maps." RFC 9420, DOI 10.17487/RFC9240, <https://www.rfc-editor.org/info/rfc9240> (Jul. 2022): 1-53.

[RFC9439] Wu, Q., et al. "Application-Layer Trafc Optimization (ALTO) Performance Cost Metrics." RFC 9439, DOI 10.17487/RFC9439 <https://datatracker.ietf.org/doc/rfc9439/> (Aug. 2023): 1-35.

Final Office Action in U.S. Appl. No. 18/594,471; dated Sep. 30, 2025 (13 pgs.).

* cited by examiner

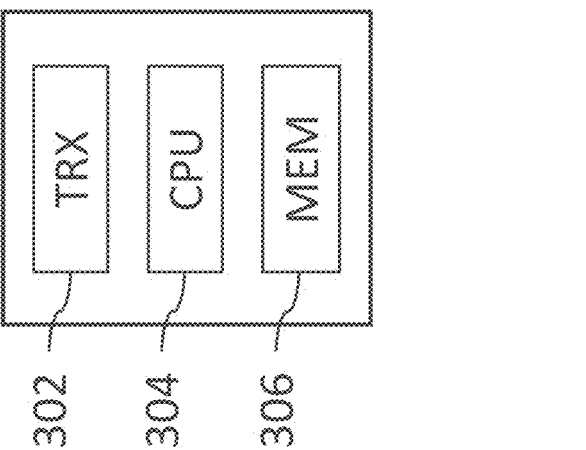
FIG. 3     300

CACHE-ASSISTED SERVICE CONTACT INSTANCE SELECTION FOR COMPUTING-AWARE TRAFFIC STEERING NETWORKS

BACKGROUND

Field of the Disclosure

The present disclosure relates to communication networks and, more specifically but not exclusively, to the selection of service contact instances in a communication network that employs computing-aware traffic steering.

Description of the Related Art

This section introduces aspects that may help facilitate a better understanding of the disclosure. Accordingly, the statements of this section are to be read in this light and are not to be understood as admissions about what is prior art or what is not prior art.

The Internet Engineering Task Force (IETF) has chartered the so-called Computing-Aware Traffic Steering (CATS) working group to consider the problem of how the network edge can steer traffic between clients of a service and sites offering the service. The working group intends to bridge the gap between network metrics such as bandwidth, latency, etc., and compute metrics (aka service metrics) such as processing, storage capabilities, etc., in coming up with a solution that can optimize how a network edge node steers traffic based on these metrics, as appropriate to the service.

The CATS working group has proposed a framework for CATS. The framework consists of components like a CATS-Path Selector (C-PS) that receives help from a CATS-Traffic Classifier (C-TC) to route user/client traffic to/from the most-optimal service contact instance via a CATS Router (i.e., an edge site). In order to determine the most-optimal service contact instance, the C-PS collects and uses network metrics from a CATS-Network Metrics Agent (C-NMA) and compute-resource metrics from a CATS-Service Metrics Agent (C-SMA).

SUMMARY

The service contact instance selected by the proposed C-PS by evaluating network and compute resources might not be the most-optimal instance if there is cached content already available in a nearby service contact instance. Prioritizing existing cached content might avoid additional computing at the service contact instance and deliver a faster response. The current IETF CATS framework lacks a cache element in its functional architecture. In order to further optimize traffic steering by avoiding redundant computations in the network, there is a need for a cache element interface in the CATS framework.

BRIEF DESCRIPTION OF THE DRAWINGS

Embodiments of the disclosure will become more fully apparent from the following detailed description, the appended claims, and the accompanying drawings in which like reference numerals identify similar or identical elements.

FIG. 3 is a simplified hardware block diagram of an example node that can be used to implement any of the ingress and egress nodes of FIG. 1.

DETAILED DESCRIPTION

Detailed illustrative embodiments of the present disclosure are disclosed herein. However, specific structural and functional details disclosed herein are merely representative for purposes of describing example embodiments of the present disclosure. The present disclosure may be embodied in many alternate forms and should not be construed as limited to only the embodiments set forth herein. Further, the terminology used herein is for the purpose of describing particular embodiments only and is not intended to be limiting of example embodiments of the disclosure.

As used herein, the singular forms "a," "an," and "the," are intended to include the plural forms as well, unless the context clearly indicates otherwise. It further will be understood that the terms "comprises," "comprising," "contains," "containing," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functions/acts involved.

Figure 1:
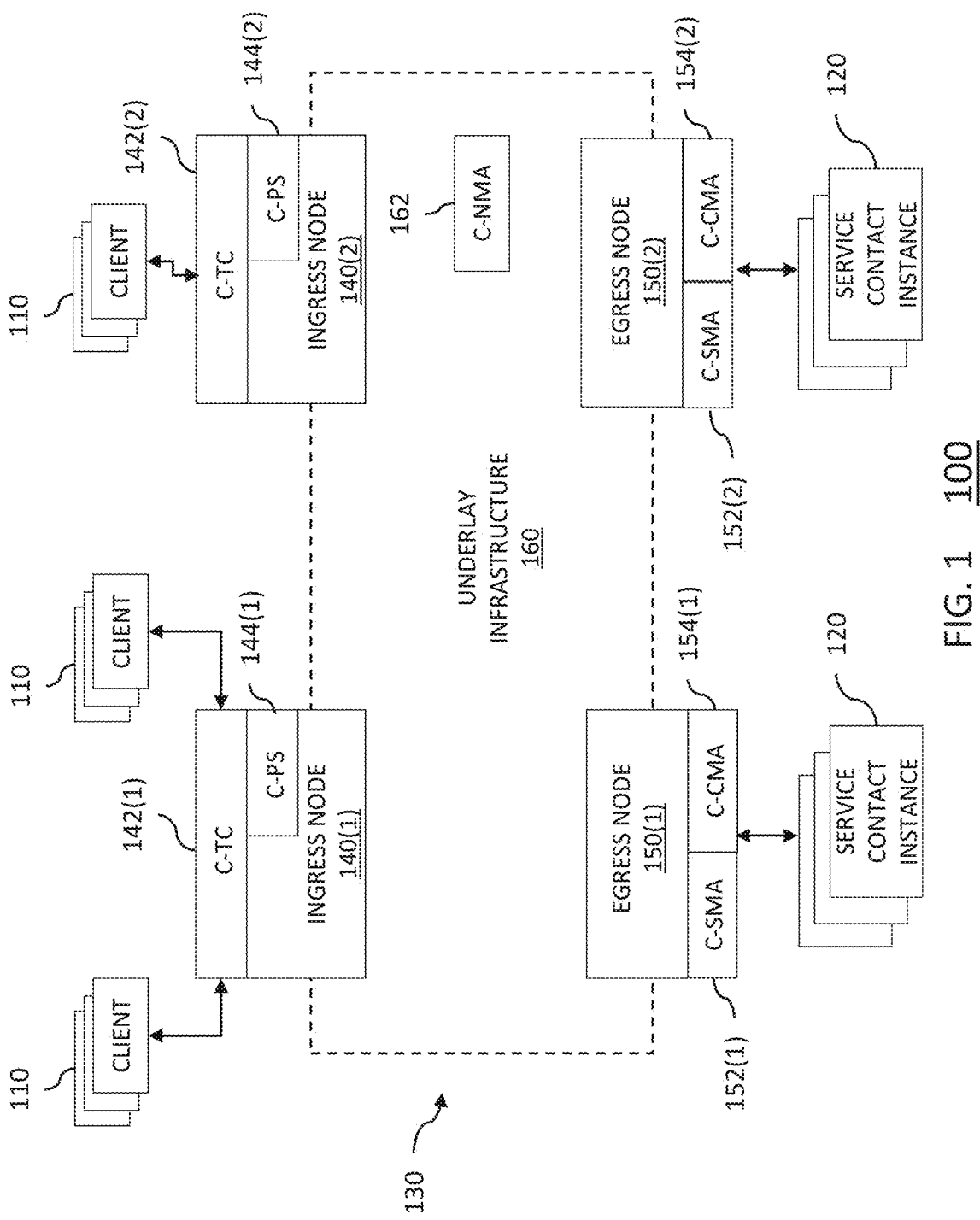
FIG. 1 is a block diagram of a basic CATS communications network according to an embodiment of the present disclosure.

FIG. 1 is a block diagram of a basic CATS communications network 100 according to an embodiment of the present disclosure. Network 100 includes a number of clients 110 that receive services from a number of service contact instances 120 via a communication infrastructure 130. Examples of services may include streaming of video/audio content from a service contact instance 120 to a client 110.

In the basic embodiment of FIG. 1, the infrastructure 130 includes (i) two ingress nodes 140(1) and 140(2), each of which communicates with one or more different clients 110, (ii) two egress nodes 150(1) and 150(2), each of which communicates with one or more service contact instances 120, and (iii) an underlay infrastructure 160, which may be, for example, a mesh network of routers (not shown in FIG. 1) that provides configurable communication paths between the ingress and egress nodes 140 and 150. Those skilled in the art will understand that, in general, infrastructures of the disclosure may have any suitable number of ingress nodes 140 and any suitable number of egress nodes 150.

As shown in FIG. 1, each ingress node 140 has a CATS-Path Selector (C-PS) 144 that is responsible for (a) selecting a service contact instance 120 for each service requested by one of its clients 110 and (b) defining a path through the underlay infrastructure 160 to support that service. To achieve those functions for a particular service requested by a particular client 110, the C-PS 144 receives and uses (i) compute metrics from a CATS-Service Metrics Agent (C-SMA) 152 in each egress node 150 connected to a service contact instance 120 corresponding to the requested service and (ii) network metrics from a CATS-Network Metrics Agent (C-NMA) 162 that monitors the underlay infrastructure 160.

In addition to those two types of metrics, in order to select a particular service contact instance 120 for the particular requested service, the C-PS 144 also receives and uses cache metrics from a CATS-Cache Metrics Agent (C-CMA) 154 in each egress node 150 connected to a service contact instance 120 corresponding to the requested service. Depending on the particular implementation, cache metrics may include one or more of the size of cache data, the type of cache data, the creation time of the cached data, the time-to-live (i.e., expiry time) of the cache data, and the cache hits (i.e., the number of times particular cache data is queried/consumed.

Thus, the C-PS 144 selects service contact instances 120 using (i) compute metrics from one or more C-SMAs 152, (ii) network metrics from the C-NMA 162, and (iii) cache metrics from one or more C-CMAs 154.

Figure 2:
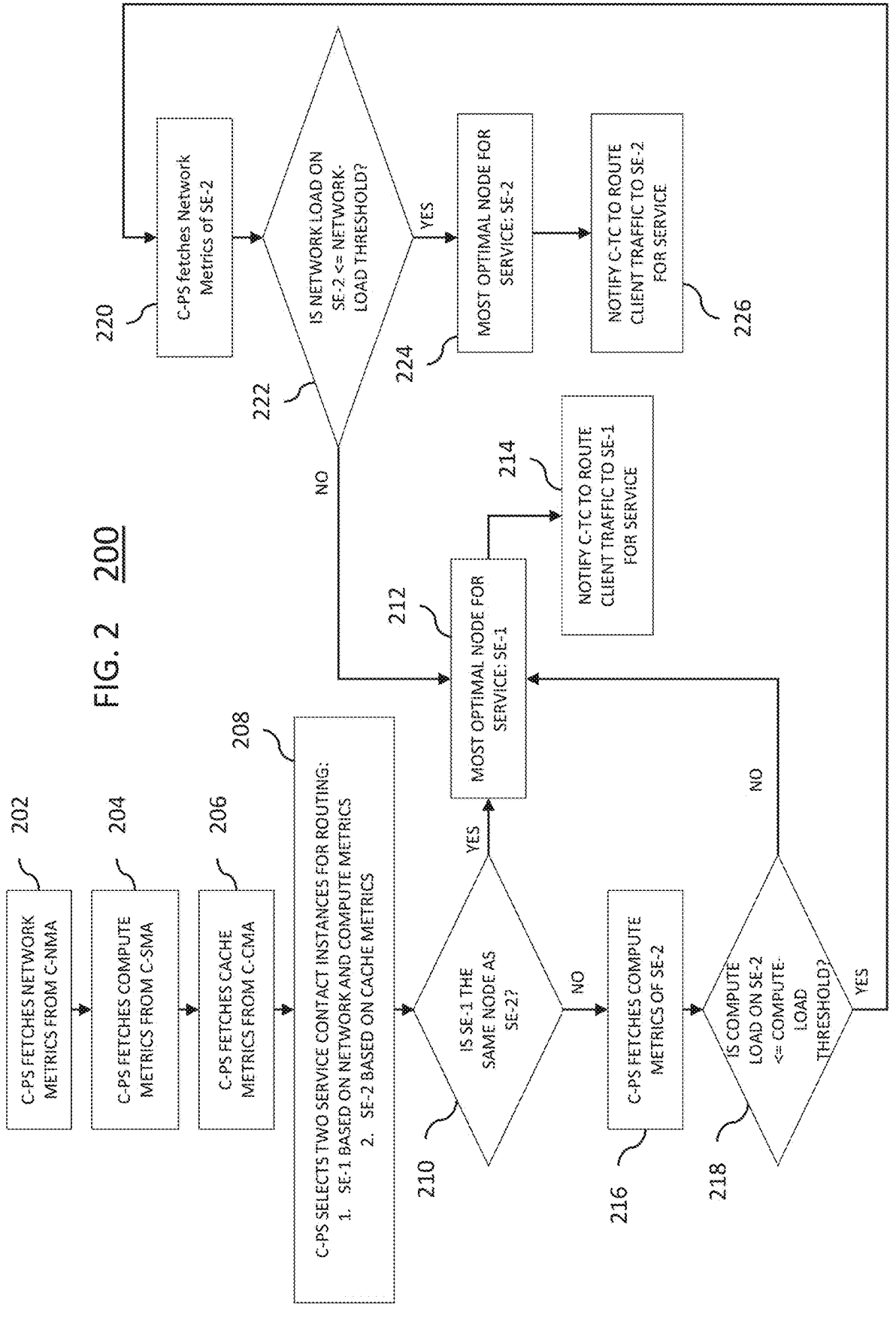
FIG. 2 is a flow diagram for one possible algorithm implemented by the C-PS of an ingress node of FIG. 1 to select a service contact instance for a particular service.

FIG. 2 is a flow diagram for one possible algorithm 200 implemented by the C-PS 144 of an ingress node 140 of FIG. 1 to select a service contact instance 120 in response to receiving, from a particular client 110 associated with that ingress node 140, a request for a particular service.

In step 202, the C-PS 144 fetches network metrics from the C-NMA 162. In step 204, the C-PS 144 fetches compute metrics from the C-SMA 152 of each egress node 150 that connects to a service contact instance 120 corresponding to the requested service. In step 206, the C-PS 144 fetches cache metrics from the C-CMA 154 of each egress node 150 that connects to a service contact instance 120 corresponding to the requested service.

In step 208, the C-PS 144 generates two possible (i.e., candidate) selections of service contact instances 120. The first candidate selection (SE-1) is based on the network and compute metrics received in steps 202 and 204, respectively, without relying on any of the cache metrics received in step 204. Network metrics of a service contact instance, such as (without limitation) latency, bandwidth, and jitter, and compute metrics of a service contact instance, such as (without limitation) CPU utilization and memory load, are evaluated to select the instance as a candidate for delivering the service. Depending on the implementation, a service contact instance with the most-favorable network metrics (e.g., lower latency, bandwidth, and jitter) and compute metrics (e.g., lower CPU utilization and memory load) is selected. Among the two sets of metrics, network metrics are taken as a priority. If the network metrics are favorable, then a service contact instance that has a tolerable limit of compute metrics is selected as a candidate for delivering the service, where tolerable limit may mean a CPU percentage and memory load below specified thresholds.

The second candidate selection (SE-2) is based on the cache metrics received in step 204, without relying on any of the network and compute metrics received in steps 202 and 204, respectively. Cache metrics, such as (without limitation) cache size and cache creation time, are evaluated to select the service contact instance as a candidate for delivering the service. When a user requests a particular content (audio/video), the C-PS 144 selects the nearest service contact instance (in terms of physical/logical distance by counting the number of hops) that has cached content that the user can consume.

In step 210, the C-PS 144 determines whether the two candidate selections are the same service contact instance 120. If so, then, in step 212, the C-PS 144 determines that that selected service contact instance 120 is the most-optimal node for the requested service and, in step 214, the C-PS 144 notifies its C-TC 142 to route the client traffic to that selected SE-1 service contact instance 120 for the requested service.

If the C-PS 144 determines in step 210 that the two candidate selections SE-1 and SE-2 are not the same, then, in step 216, the C-PS 144 fetches the compute metrics for SE-2 and, in step 218, the C-PS 144 determines whether the compute load based on those SE-2 compute metrics is less than or equal to a specified compute-load threshold. The compute-load threshold can vary for different form factors of contact service instances. For example, an instance with 64 cores/vCPUs can have a higher compute-load threshold compared to another instance with 4 cores/vCPUs. Hence, a network administrator pre-configures the compute-load threshold based on the form factor of the contact service instance. In some implementations, the comparison of step 218 involves a number of parallel comparisons between different compute metrics, such as CPU utilization and memory load, and different corresponding threshold values, such as one threshold value for CPU utilization and a different threshold value for memory load. The result of step 218 will be "No" if any one of the different compute metrics exceeds its corresponding threshold value. If so, then, in step 212, the C-PS 144 determines that SE-1 is the optimal service contact instance 120 for the requested service and processing continues to step 214 as before. If, however, C-PS 144 determines in step 218 that the compute load is less than or equal to the compute-load threshold (that is, all compute metrics are not greater than their corresponding threshold values), then processing proceeds to step 220.

In step 220, the C-PS 144 fetches the network metrics for SE-2 and, in step 222, the C-PS 144 determines whether a network load based on those SE-2 network metrics is less than or equal to a specified network-load threshold. Network congestion in a network could potentially deteriorate the user experience. To ensure the Service Level Agreements (SLA) in a network, network congestion is detected using pre-defined thresholds. Network congestion (in terms of bandwidth, latency, etc.) depends on the type of application/service consumed at the service contact instance. Due to the dynamic nature of the network, network metric thresholds are also pre-configured by the network administrator, where each different network metric, such as latency, bandwidth, and jitter, has its corresponding threshold value. Like the comparison in step 218, the comparison in step 222 may involve parallel comparisons of different network metrics to their corresponding threshold values. Here, too, the result of step 222 will be "No" if any one of the different network metrics exceeds its corresponding threshold value. If so, then, in step 212, the C-PS 144 determines that SE-1 is the optimal service contact instance 120 for the requested service and processing continues to step 214 as before. If, however, the C-PS 144 determines in step 222 that the network load is less than or equal to the network-load threshold (that is, all network metrics are not greater than their corresponding threshold values), then processing proceeds to step 224.

In step 224, the C-PS 144 determines that SE-2 is the optimal service contact instance 120 for the requested service and, in step 226, the C-PS 144 notifies its C-TC 142 to route the client traffic to that selected SE-2 service contact instance 120 for the requested service.

In general, algorithm 200 of FIG. 2 prioritizes the selection SE-2 that is generated based only on cache metrics as long as that selection SE-2 is not too costly in terms of compute load and network load. If either the compute load or the network load of selection SE-2 is too costly, then the selection SE-1 that is generated based on only the compute and network metrics is used.

Those skilled in the art will understand that, in an alternative implementation of the algorithm 200, steps 220 and 222 may be performed before steps 216 and 218.

In another alternative implementation of the algorithm 200, the C-PS 144 does not generate SE-1 until after the C-PS 144 determines that SE-2 is too costly. In such an embodiment, steps 202 and 204 and the first half of step 208 can be deferred until after step 222, and step 210 can be omitted.

In other embodiments of the disclosure, a C-PS 144 selects the service contact instance 120 for a requested service using other algorithms that take into account cache metrics with or without taking into account network metrics and/or compute metrics.

FIG. 3 is a simplified hardware block diagram of an example node 300 that can be used to implement any of the ingress and egress nodes 140 and 150 of FIG. 1. As shown in FIG. 3, the node 300 includes (i) communication hardware (e.g., wireless, wireline, and/or optical transceivers (TRX)) 302 that supports communications with other elements, (ii) a processor (e.g., CPU microprocessor) 304 that controls the operations of the node 300, and (iii) a memory (e.g., RAM, ROM) 306 that stores code executed by the processor 304 and/or data generated and/or received by the node 300. When node 300 is an ingress node 140 of FIG. 1, the processor 304 implements both the corresponding C-TC 142 and the corresponding C-PS 144. Similarly, when node 300 is an egress node 150 of FIG. 1, the processor 304 implements both the corresponding C-SMA 152 and the corresponding C-CMA 154.

In certain embodiments, the present disclosure is method for determining a selected service contact instance for a requested service in a computing-aware traffic steering (CATS) network. The method comprises an ingress node of the CATS network (a) receiving cache metrics for one or more possible service contact instances for the requested service; (b) determining the selected service contact instance for the requested service based on the cache metrics; and (c) implementing the requested service based on the selected service contact instance.

In at least some of the above embodiments, the method further comprises the ingress node receiving compute metrics for the one or more possible service contact instances and receiving network metrics for the one or more possible service contact instances, wherein the ingress node determines the selected service contact instance for the requested service based on the compute, network, and cache metrics.

In at least some of the above embodiments, determining the selected service contact instance comprises selecting a cache-metric candidate service contact instance based on the cache metrics; determining if the cache-metric candidate service contact instance satisfies at least one of (i) one or more compute-metric threshold tests and (ii) one or more network-metric threshold tests; if so, then determining the cache-metric candidate service contact instance to be the selected service contact instance; and, if not, then determining a compute-and-network-metrics candidate service contact instance to be the selected service contact instance.

In at least some of the above embodiments, the cache-metric candidate service contact instance is determined to be the selected service contact instance if the cache-metric candidate service contact instance is determined to satisfy both (i) the one or more compute-metric threshold tests and (ii) the one or more network-metric threshold tests; and the compute-and-network-metrics candidate service contact instance is determined to be the selected service contact instance if the cache-metric candidate service contact instance is determined to fail at least one compute-metric threshold test or network-metric threshold test.

In at least some of the above embodiments, the compute-and-network-metrics candidate service contact instance is selected based on the compute and network metrics, but not on the cache metrics.

In at least some of the above embodiments, the compute-and-network-metrics candidate service contact instance is selected before determining whether the cache-metric candidate service contact instance fails at least one of the compute-metric threshold test and the network-metric threshold test.

In at least some of the above embodiments, the compute-and-network-metrics candidate service contact instance is selected after determining that the cache-metric candidate service contact instance fails at least one of the compute-metric threshold test and the network-metric threshold test.

In at least some of the above embodiments, the compute metrics and the cache metrics are received from one or more egress nodes of the CATS network; and the network metrics are received from a network metric agent of the CATS network.

Unless explicitly stated otherwise, each numerical value and range should be interpreted as being approximate as if the word "about" or "approximately" preceded the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence. Likewise, additional steps may be included in such methods, and certain steps may be omitted or combined, in methods consistent with various embodiments of the disclosure.

Reference herein to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. The same type of distinction applies to the use of terms "attached" and "directly attached," as applied to a description of a physical structure. For example, a relatively thin layer of adhesive or other suitable binder can be used to implement such "direct attachment" of the two corresponding components in such physical structure.

As used herein in reference to an element and a standard, the terms "compatible" and "conform" mean that the element communicates with other elements in a manner wholly or partially specified by the standard, and would be recognized by other elements as sufficiently capable of communicating with the other elements in the manner specified by the standard. A compatible or conforming element does not need to operate internally in a manner specified by the standard.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

As will be appreciated by one of ordinary skill in the art, the present disclosure may be embodied as an apparatus (including, for example, a system, a network, a machine, a device, a computer program product, and/or the like), as a method (including, for example, a business process, a computer-implemented process, and/or the like), or as any combination of the foregoing. Accordingly, embodiments of the present disclosure may take the form of an entirely software-based embodiment (including firmware, resident software, micro-code, and the like), an entirely hardware embodiment, or an embodiment combining software and hardware aspects that may generally be referred to herein as a "system" or "network".

Embodiments of the disclosure can be manifest in the form of methods and apparatuses for practicing those methods. Embodiments of the disclosure can also be manifest in the form of program code embodied in tangible media, such as magnetic recording media, optical recording media, solid state memory, floppy diskettes, CD-ROMs, hard drives, or any other non-transitory machine-readable storage medium, wherein, upon the program code being loaded into and executed by a machine, such as a computer, the machine becomes an apparatus for practicing the disclosure. Embodiments of the disclosure can also be manifest in the form of program code, for example, stored in a non-transitory machine-readable storage medium including being loaded into and/or executed by a machine, wherein, upon the program code being loaded into and executed by a machine, such as a computer, the machine becomes an apparatus for practicing the disclosure. Upon being implemented on a general-purpose processor, the program code segments combine with the processor to provide a unique device that operates analogously to specific logic circuits. The term "non-transitory," as used herein, is a limitation of the medium itself (i.e., tangible, not a signal) as opposed to a limitation on data storage persistency (e.g., RAM vs. ROM).

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements. For example, the phrases "at least one of A and B" and "at least one of A or B" are both to be interpreted to have the same meaning, encompassing the following three possibilities: 1—only A; 2—only B; 3—both A and B.

All documents mentioned herein are hereby incorporated by reference in their entirety or alternatively to provide the disclosure for which they were specifically relied upon.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

As used herein and in the claims, the term "provide" with respect to an apparatus or with respect to a system, device, or component encompasses designing or fabricating the apparatus, system, device, or component; causing the apparatus, system, device, or component to be designed or fabricated; and/or obtaining the apparatus, system, device, or component by purchase, lease, rental, or other contractual arrangement.

While preferred embodiments of the disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the technology of the disclosure. It is intended that the following claims define the scope of the invention and that methods and structures within the scope of these claims and their equivalents be covered thereby.

What is claimed is:

1. A method for determining a selected service contact instance for a requested service in a computing-aware traffic steering (CATS) network, the method comprising an ingress node of the CATS network:
    receiving cache metrics for one or more possible service contact instances for the requested service, wherein the cache metrics are different from compute and network metrics;
    determining the selected service contact instance for the requested service based on the cache metrics; and
    implementing the requested service based on the selected service contact instance.

2. The method of claim 1, further comprising the ingress node:
    receiving compute metrics for the one or more possible service contact instances; and receiving network metrics for the one or more possible service contact instances, wherein the ingress node determines the selected service contact instance for the requested service based on the compute, network, and cache metrics.

3. The method of claim 2, wherein determining the selected service contact instance comprises:

selecting a cache-metric candidate service contact instance based on the cache metrics;

determining if the cache-metric candidate service contact instance satisfies at least one of (i) one or more compute-metric threshold tests and (ii) one or more network-metric threshold tests;

if so, then determining the cache-metric candidate service contact instance to be the selected service contact instance; and if not, then determining a compute-and-network-metrics candidate service contact instance to be the selected service contact instance.

4. The method of claim 3, wherein:

the cache-metric candidate service contact instance is determined to be the selected service contact instance if the cache-metric candidate service contact instance is determined to satisfy both (i) the one or more compute-metric threshold tests and (ii) the one or more network-metric threshold tests; and the compute-and-network-metrics candidate service contact instance is determined to be the selected service contact instance if the cache-metric candidate service contact instance is determined to fail at least one compute-metric threshold test or network-metric threshold test.

5. The method of claim 3, wherein the compute-and-network-metrics candidate service contact instance is selected based on the compute and network metrics, but not on the cache metrics.

6. The method of claim 3, wherein the compute-and-network-metrics candidate service contact instance is selected before determining whether the cache-metric candidate service contact instance fails at least one of the compute-metric threshold test and the network-metric threshold test.

7. The method of claim 3, wherein the compute-and-network-metrics candidate service contact instance is selected after determining that the cache-metric candidate service contact instance fails at least one of the compute-metric threshold test and the network-metric threshold test.

8. The method of claim 2, wherein:

the compute metrics and the cache metrics are received from one or more egress nodes of the CATS network; and the network metrics are received from a network metric agent of the CATS network.

9. An apparatus comprising:

at least one processor; and at least one memory storing instructions that, upon being executed by the at least one processor, cause the apparatus at least to:

receive cache metrics for one or more possible service contact instances for the requested service, wherein the cache metrics are different from compute and network metrics;

determine the selected service contact instance for the requested service based on the cache metrics; and implement the requested service based on the selected service contact instance.

10. The apparatus of claim 9, wherein the apparatus is further adapted to:

receive compute metrics for the one or more possible service contact instances; and receive network metrics for the one or more possible service contact instances, wherein the apparatus is adapted to determine the selected service contact instance for the requested service based on the compute, network, and cache metrics.

11. The apparatus of claim 10, wherein the apparatus is adapted to determine the selected service contact instance by:

selecting a cache-metric candidate service contact instance based on the cache metrics;

determining if the cache-metric candidate service contact instance satisfies at least one of (i) one or more compute-metric threshold tests and (ii) one or more network-metric threshold tests;

if so, then determining the cache-metric candidate service contact instance to be the selected service contact instance; and if not, then determining a compute-and-network-metrics candidate service contact instance to be the selected service contact instance.

12. The apparatus of claim 11, wherein:

the apparatus is adapted to determine the cache-metric candidate service contact instance to be the selected service contact instance if the cache-metric candidate service contact instance is determined to satisfy both (i) the one or more compute-metric threshold tests and (ii) the one or more network-metric threshold tests; and the apparatus is adapted to determine the compute-and-network-metrics candidate service contact instance to be the selected service contact instance if the cache-metric candidate service contact instance is determined to fail at least one compute-metric threshold test or network-metric threshold test.

13. The apparatus of claim 11, wherein the apparatus is adapted to select the compute-and-network-metrics candidate service contact instance based on the compute and network metrics, but not on the cache metrics.

14. The apparatus of claim 11, wherein the apparatus is adapted to select the compute-and-network-metrics candidate service contact instance before determining whether the cache-metric candidate service contact instance fails at least one of the compute-metric threshold test and the network-metric threshold test.

15. The apparatus of claim 11, wherein the apparatus is adapted to select the compute-and-network-metrics candidate service contact instance after determining that the cache-metric candidate service contact instance fails at least one of the compute-metric threshold test and the network-metric threshold test.

16. The apparatus of claim 10, wherein the apparatus is adapted to:

receive the compute metrics and the cache metrics from one or more egress nodes of the CATS network; and receive the network metrics from a network metric agent of the CATS network.

17. The apparatus of claim 9, wherein the apparatus is an ingress node of a CATS network.

* * * * *